United States Patent Office 3,453,238
Patented July 1, 1969

3,453,238
PROCESS FOR PREPARING COPOLYMERS OF TRIOXANE, CYCLIC ETHERS AND ALKYL GLYCIDYL FORMALS
Edgar Fischer, Frankfurt am Main, and Claus Schott and Klaus Asmus, Hofheim, Taunus, Germany, assignors to Farbwerke Hoechst Aktiengesellschaft vormals Meister Lucius & Bruning, Frankfurt am Main, Germany, a corporation of Germany
No Drawing. Filed Feb. 10, 1966, Ser. No. 526,399
Claims priority, application Germany, Mar. 5, 1965, F 45,425
Int. Cl. C08g 1/14
U.S. Cl. 260—67                4 Claims

ABSTRACT OF THE DISCLOSURE

A process has been provided for preparing copolymers of trioxane, cyclic ether and bifunctional compounds in the presence of a cationic catalyst at a temperature in the range of from −50 to +100° C., which comprises polymerizing a mixture consisting of 97.9% to 88% by weight of trioxane; 2 to 10% by weight of a cyclic ether of the general formula

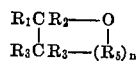

in which $R_1$, $R_2$, $R_3$, and $R_4$ stand for hydrogen, alkyl radicals or halogen-substituted alkyl radicals, $R_5$ represents a methylene or oxymethylene group or an alkyl- or halogenalkyl-substituted oxymethylene group and $n$ is 0 to 3, or $R_5$ represents $-(O-CH_2-CH_2)_m-OCH_2-$, in which case $n$ is 1 and $m$ is 1 to 3; and 0.1 to 2% by weight of an alkyl-glycidyl-formal. The produced copolymers are within the scope of the invention. These copolymers are useful for injection moulding of large area structures displaying considerably improved flowability when melted.

---

The present invention relates to polyoxymethylene copolymers with improved flowability and to a process for preparing the said copolymers from trioxane, cyclic ethers and alkyl-glycidyl-formals.

It is known to prepare macromolecular polymers with recurring oxymethylene units by polymerizing formaldehyde or by polymerizing trioxane. It is also known to prepare thermally stable polyacetals by copolymerizing trioxane with saturated cyclic ethers, for example glycol-formal or ethylene oxide. Products of this type are preponderantly used for injection moulding. Furthermore, it is known to produce copolymers from trioxane, cyclic ethers and bifunctional compounds. The known bifunctional compounds, however, readily interlace the copolymers, whereby infusible products are obtained.

It has now been found that copolymers can advantageously be produced from trioxane, cyclic ethers and bifunctional compounds by polymerizing mixtures of 97.9 to 88% by weight of trioxane, 2 to 10% by weight of a cyclic ether and 0.1 to 2% by weight of an alkyl-glycidyl-formal.

By cyclic ethers there are to be understood, for example compounds of the general formula

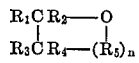

in which $R_1$–$R_4$ stand for hydrogen, alkyl radicals or halogen-substituted alkyl radicals, $R_5$ represents a methylene or oxymethylene group or an alkyl- or halogen-alkyl-substituted methylene group or an alkyl- or halogenalkyl-substituted oxymethylene group and $n$ is 0 to 3, or $R_5$ represents $-(O-CH_2-CH_2)_m-OCH_2-$, in which case $n$ is 1 and $m$ is 1 to 3.

The aforesaid alkyl radicals contain 1 to 5 carbon atoms and may contain 0 to 3 halogen atoms, preferably chlorine atoms.

Especially suitable cyclic ethers are ethylene oxide, glycol-formal and diglycol-formal. Besides these compounds, propylene oxide, epichlorohydrin and 4-chloromethyldioxolane may be used.

Suitable alkyl-glycidyl-formals are compounds of the formula

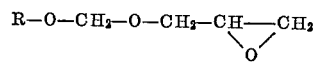

in which the alkyl group R contains 1 to 10 carbon atoms, preferably 1 to 5 carbon atoms. There can be used, for example, methyl-glycidyl-formal, ethyl-glycidyl-formal, propyl-glycidyl-formal and butyl-glycidyl-formal. The alkyl-glycidyl-formals are advantageously used in an amount of 0.5 to 1.5% by weight.

The copolymers are characterized by a considerably improved flowability of the polymer melts, a property which is of decisive importance for the manufacture of large-area injection moulded articles.

The polymerization can be carried out according to the usual methods, that is to say in substance, in solution or in suspension. As solvents there are preferably used inert aliphatic and aromatic hydrocarbons, halogenated hydrocarbons or ethers. The polymerization in substance is particularly easy to carry out. Depending on the solvent used, the polymerization is accomplished at temperatures in the range of from −50 to +100° C.

The polymerization is initiated by means of known cationic catalysts. Suitable catalysts are, for example, inorganic and organic acids, acid halides, and particularly Lewis acids (cf. Kortüm, Lehrbuch der Elektrochemie, Wiesbaden, 1948, pages 300–301). From among the latter boron fluorides and the complex compounds thereof, for example boron trifluoride etherates, are very suitable.

Particularly useful are the diazonium fluoborates known from Belgian Patents 593,648 and 618,213 and the compounds known from Belgian Patent 585,980.

The concentration of the catalysts may vary within wide limits. It is dependent on the type of the catalyst and the height of the molecular weight the polymer shall have. It may be in the range of from 0.0001 to 1% by weight, calculated on the monomer mixture, and preferably in the range of from 0.001 to 0.1% by weight of catalyst.

As the catalysts to be used in the process according to the invention tend to decompose the polymer, it is recommendable to inactivate them directly at the end of the polymerization, for example by means of ammonia or with methanolic or aromatic amine solutions.

Unstable terminal semiacetal groups can be removed in known manner, like in other copolymers. It is appropriate to suspend the polymer in aqueous ammonia at a temperature of from 100 to 200° C., if desired in the presence of a swelling agent such as methanol or n-propanol, or to dissolve the polymer in an alkaline medium at a temperature above 100° C. with subsequent precipitation. Suitable solvents are, for example, benzyl alcohol, ethylene glycol monoethyl ether, or a mixture consisting of 60% of methanol and 40% of water, suitable alkaline compounds are ammonia and aliphatic amines.

The stabilization of the polymers against the action of heat, light and oxygen can be brought about in the same manner as with other trioxane co- and terpolymers. Suitable heat stabilizers are, for example, polyamides, amides of polybasic carboxylic acids, amidines and urea compounds. As oxidation stabilizers there can be used phenols, particularly bisphenols and aromatic amines. α-Hydroxybenzo-phenone derivatives are effective light stabilizers.

The copolymers are especially suitable for injection moulding large-area structures, but also for extrusion as well as for the manufacture of foils, films and fibers.

The following examples serve to illustrate the invention but they are not intended to limit it thereto.

EXAMPLE 1

A trioxane solution containing 2% by weight of ethylene oxide and 0.8% by weight of methyl-glycidyl-formal was pumped at 70° C. into a Ko-kneader. Simultaneously, a solution of $BF_3$-dibutyl etherate in cyclohexane in a ratio of 1:80 was injected into the kneader, the pumping speeds being regulated in a manner such that 80 p.p.m. of $BF_3$ dissolved in the monomer mixture. The polymer dropped from the kneader into a 1% ammonia solution used as quenching medium. The product was ground while wet and hydrolyzed in heterogeneous phase in an ammonia solution of 1% strength in a ratio of 1 to 4. The temperature of hydrolysis was 141° C., the pressure amounted to 3.6 atmospheres gauge. The product was washed and dried. According to ASTM-D 1238–52 T, the product had a melt index $i_2=14$; $i_{15}=272$ (terpolymer I).

EXAMPLE 2

100 grams of trioxane, 2 cc. of ethylene oxide and 1 cc. of butyl-glycidyl-formal were polymerized in a screw-top glass bottle at a temperature of the thermostat of 70° C., using as catalyst 10 milligrams of p-nitrophenyl-diazonium fluoborate. After polymerization the block was comminuted and ground and the product was hydrolyzed in homogeneous phase in 1 liter of benzyl alcohol for 30 minutes at 150° C. in the presence of 10 cc. of triethanolamine. When the hydrolysis has been terminated, the product was precipitated with methanol, filtered off with suction, boiled in methanol, washed and dried. The product had a melt index $i_2=10$ and $i_{20}=450$.

Comparative Example I

The product prepared as described in Example 1 was compared with copolymers (I and II) made from 100 parts of trioxane and 2 parts of ethylene oxide according to the same method. For comparison the polymers were injection moulded in spiral form to measure their flowability. The length of the spiral was measured in centimeters.

| Melt index | Copolymer I | Copolymer II | Terpolymer I |
|---|---|---|---|
| $i_2$ | 9 | 14.7 | 14 |
| $i_{15}$ | 90 | 158 | 272 |
| Injection moulding in spiral form: | | | |
| Under 40 atmospheres gauge (cm.) | 22 | 24 | 32.5 |
| Under 50 atmospheres gauge (cm.) | 26.5 | 27 | 39.0 |
| Under 60 atmospheres gauge (cm.) | 30 | | 44.0 |
| Notched bar impact strength DIN 53453, kg. cm./cm.² | | 2.6 | 3.7 |

Comparative Example 2

100 grams of trioxane, 2 cc. of ethylene oxide and 0.8 cc. of butane-diol diglycidyl ether were polymerized in a screw-top glass bottle at a temperature of the thermostat of 70° C., using 10 milligrams of p-nitrophenyldiazonium fluoborate. A hydrolysis of the product in benzyl alcohol was not possible because it was insoluble. Moreover, the polymer was infusible so that the spiral test could not be carried out. Owing to the fact that the product was obviously incapable of being processed, it had no industrial value. Fusible terpolymers on the basis of butane-diol diglycidyl ether with low concentration of termonomer which were produced with the aid of regulators so as to adjust a viscosity suitable for injection moulding had a notched bar impact strength about 15% below that of the corresponding copolymers.

What is claimed is:

1. A process for preparing copolymers of trioxane, cyclic ethers and bifunctional compounds in the presence of a cationic catalyst at a temperature in the range of from −50 to +100° C., which comprises polymerizing a mixture consisting of 97.9 to 88% by weight of trioxane; 2 to 10% by weight of a cyclic ether of the general formula

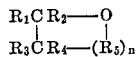

in which $R_1$, $R_2$, $R_3$, and $R_4$ stand for hydrogen, alkyl radicals or halogen-substituted alkyl radicals, $R_5$ represents a methylene or oxymethylene group or an alkyl- or halogenalkyl-substituted methylene group or an alkyl- or halogenalkyl-substituted oxymethylene group and $n$ is 0 to 3, or $R_5$ represents $-(O-CH_2-CH_2)_m-OCH_2-$, in which case $n$ is 1 and $m$ is 1 to 3; and 0.1 to 2% by weight of an alkyl-glycidyl-formal, wherein the alkyl group has 1 to 10 carbon atoms.

2. The process as claimed in claim 1, wherein the alkyl-glycidyl-formal is a compound of the formula

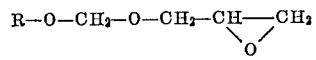

in which the alkyl group R contains 1 to 5 carbon atoms.

3. The process as claimed in claim 1, wherein the alkyl-glycidyl-formal is methyl-glycidyl-formal, ethyl-glycidyl-formal, propyl-glycidyl-formal, or butyl-glycidyl-formal.

4. A normally solid, moldable copolymer of trioxane, cyclic ethers and bifunctional compounds consisting of 97.9 to 88% by weight of randomly recurring oxymethylene groups derived from trioxane, 2 to 10% by weight of randomly recurring oxyalkylene groups derived from a cyclic ether of the general formula

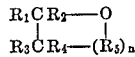

in which $R_1$, $R_2$, $R_3$, and $R_4$ stand for hydrogen, alkyl radicals or halogen-substituted alkyl radicals, $R_5$ represents a methylene or oxymethylene group or an alkyl- or halogenalkyl-substituted methylene group or an alkyl- or halogenalkyl-substituted oxymethylene group and $n$ is 0 to 3, or $R_5$ represents $-(O-CH_2-CH_2)_m-OCH_2-$, in which case $n$ is 1 and $m$ is 1 to 3; and 0.1 to 2% by weight of randomly recurring groups derived from an alkyl-glycidyl-formal wherein the alkyl group has from 1 to 10 carbon atoms.

References Cited

UNITED STATES PATENTS 3,264,266   8/1966   Merten et al. _____ 260—73
3,275,604   9/1966   Kray et al. _____ 260—67
3,385,827   5/1968   Fischer et al. _____ 260—67

WILLIAM H. SHORT, *Primary Examiner.*

L. M. PHYNES, *Assistant Examiner.*

U.S. Cl. X.R.

260—45.9, 45.95; 264—328